Patented Nov. 18, 1947

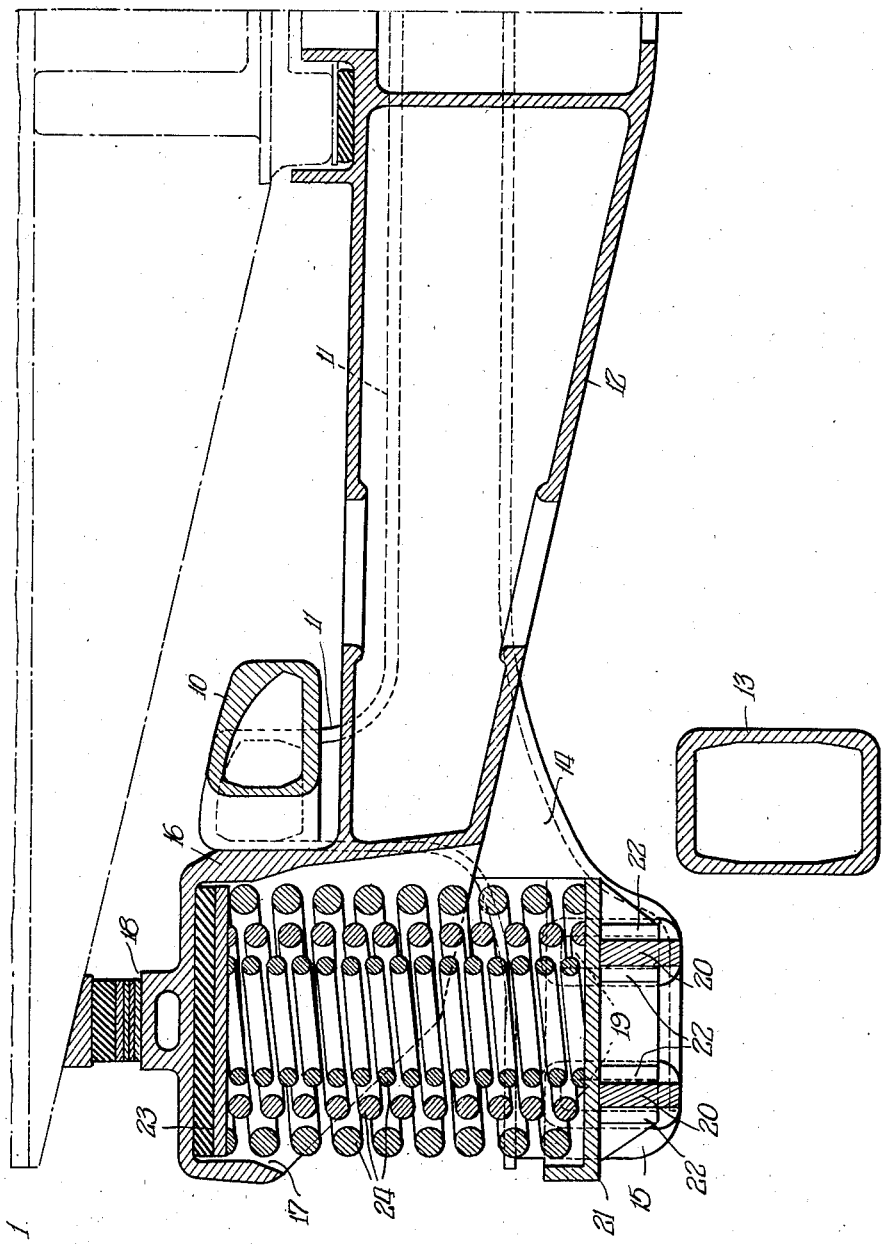

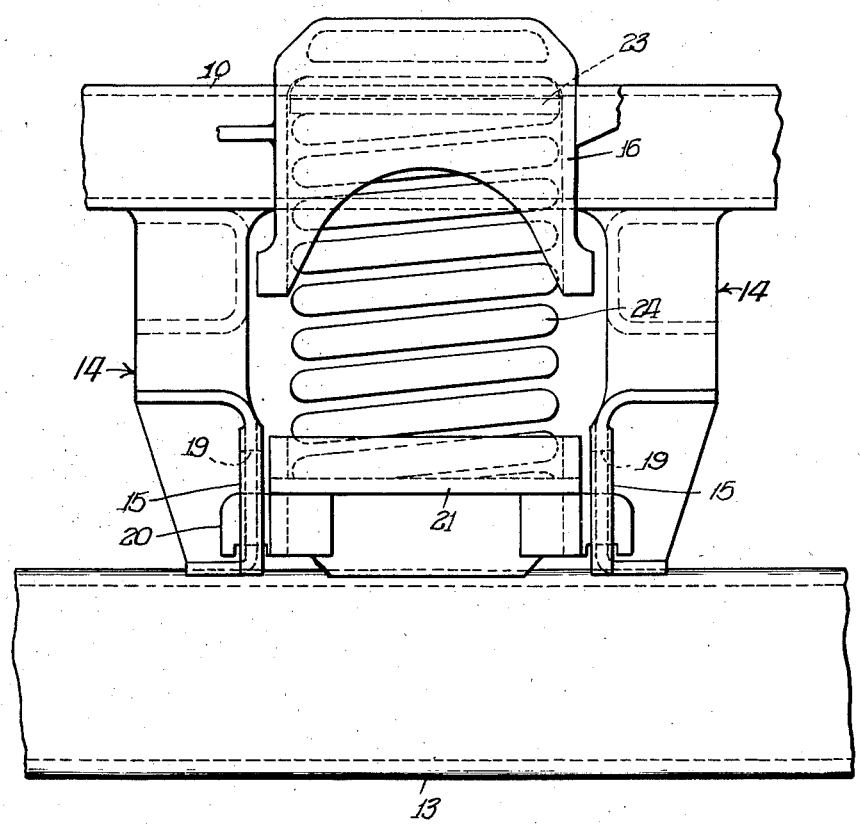

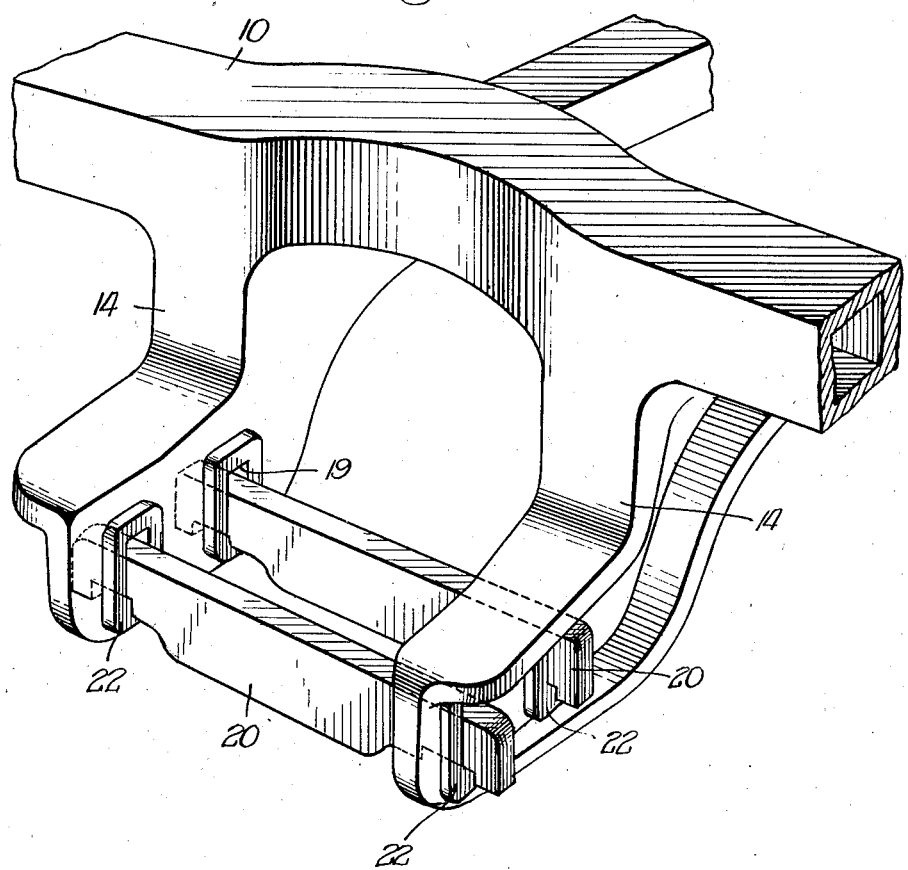

2,431,072

UNITED STATES PATENT OFFICE 2,431,072

RAILWAY CAR TRUCK STRUCTURE

Karl F. Nystrom, Nashotah, and Vernon L. Green, Milwaukee, Wis.

Application July 13, 1945, Serial No. 604,776

7 Claims. (Cl. 105—197)

1

The invention relates to trucks more especially intended for railway passenger cars and has for its object the provision of an easier riding truck wherein an improved method of controlling the lateral movement of the bolster supporting springs is provided and certain wearing elements employed in conventional passenger car trucks are eliminated.

Another object of the invention is the provision of a structure wherein the bolster spring suspension is more easily accessible and shimming or elevating of the bolster springs is greatly simplified and the spring raising operation accomplished without the need of placing the car over a pit and without disturbing the equilibrium of the car and without disassembly of the truck.

A further advantage of our improved structure is the provision of a wider spring base by increased distance between the springs at opposite sides of the truck, reducing the car roll encountered in present day constructions; the improved structure permitting the use of less expensive metal thereby reducing cost.

With our improved construction the bolster is maintained at the center line of the wheel piece and hence there are no bending moments in the truck transom resulting from car body loads.

The invention eliminates the use of swing hangers and spring plank and provides a structure wherein longer bolster springs can be employed and the springs located to the truck side exterior thereby greatly facilitating spring inspection and great resistance to car rolling provided.

The foregoing enumerated objects and advantages, as well as other advantages inherent in the invention, will all be readily comprehended from the detailed description of the accompanying drawing wherein—

Figure 1 shows the side frame members at one side of a truck in cross section, with an associated transom member partly in dotted lines (one transom member being omitted) and a longitudinal sectional view of one end of the bolster and our improved bolster suspension mechanism in sectional elevation.

Figure 2 is a side elevation of the intermediate portion of the truck side frame and equalizer, with the end of the truck bolster and our improved bolster spring suspension shown in elevation; adjacent portions of the truck (forming no part of this invention) being omitted.

Figure 3 is a perspective view of the intermediate portion of the truck side frame and transom with our improved transom extensions and spring seat member supporting keys.

As the usual wheeled journals, bearings and other elements usually involved in conventional trucks have no bearing on our invention, illustration of such elements is not deemed necessary.

The invention is applicable to a car truck, with or without equalizer members, and contemplates location of the bolster springs on the outer sides of the truck side frame members of which a portion of one side frame is shown in section at 10; the side frame members at opposite sides of the truck being united and formed integral with the two transversely disposed transom members of which a portion or end of one member is shown at 11; the transom members being parallelly arranged and spaced apart in the conventional manner to receive the truck bolster therebetween; one end of the bolster in vertical section, being shown at 12 and a section of an equalizer member being shown at 13.

The transom members are formed integral with the lower sides of the side frame members 10 and their ends curved or disposed downwardly and thence laterally beyond the outer sides of the frame members 10, as shown at 14, and the laterally extending portions formed to provide vertically disposed bracket portions 15.

The bolster 12 in our improved structure is of greater length than the conventional type and has its ends disposed beneath and outwardly beyond the side frame 10, with the outer end formed to extend upwardly above the normal plane of the body of the bolster and into a horizontal plane somewhat above the horizontal plane of the side frame member 10, as shown at 16. The upwardly disposed bolster ends are formed to provide downwardly facing and comparatively deep pockets as shown at 17; and the top of the pocketed end extension 16 is shown provided with a side bearing at 18.

The vertically disposed bracket-like extensions 15 each are shown provided with a pair of vertically elongated slots 19, which are closed at their ends and extend through the bracket portions to receive the elongated flat sided bars or rectangular keys 20, 20, whose ends are notched or provided with downwardly disposed lips adapted to engage the outer faces of the bracket-like extensions 15, to present longitudinal shifting of the keys.

The bars or keys 20, 20, which extend from the bracket extension 15 of one transom member to that of the other transom member, are intended to adjustably support the bolster spring seat members 21, (only one being shown) at each end of the bolster 12 and arranged between the extensions of the transom members. The seat members 21 preferably are in the nature of an upwardly opening receptacle to prevent lateral shifting of the bottom coils of the springs as shown; and in order to prevent lateral movement or displacement of the spring seat members, spaced downwardly extending slotted brackets or lugs 22, 22 are secured to the seat members and arranged to straddle or receive the holding bars or keys 20, 20.

The pockets in the extended ends of the bolster preferably are provided with suitable cushioning pads or elements and wear plates as shown at 23 to receive the upper ends of the nested coil springs 24.

The cross bars or keys 20, which are of rectangular cross section, are of preselected vertical dimensions or width; keys of lesser or greater width being employed when it is desired to either lower or raise the spring seat member 21 and thereby control the elevational relation of the bolster to the truck frame members; the lower coils of the springs being maintained in fixed relation with the truck frame or transom members so that any lateral movement between the bolster and the truck frame must, therefore, take place by lateral displacement of the upper coils of the springs relative to the lower coils. This method of controlling the lateral movement is quite advantageous as it provides better lateral control and eliminates the use of a number of wear producing and receiving elements heretofore employed for bolster spring suspension, namely swing hangers, swing hanger pins and sprink plank.

In order to maintain proper clearance between the bolster and the truck frame it often becomes necessary to raise the bolster. In the conventional type of truck, to accomplish this condition it is necessary to remove the spring plank or the spring plank and bolster springs and apply shims above or below the bolster springs. This operation requires the car to be placed over a pit.

With our improved structure, the bolster can be raised or its elevation altered by merely jacking under the loosely mounted spring seat 21 (easily accessible at the side of the truck), sliding the keys 20 out of the slots in the transom extensions or bracket portions 15 and replacing them by keys of greater vertical width; or by placing shims of required thickness between the keys and the spring seat and hence without reducing the depth of the spring receiving pockets.

As is apparent with spring seat supporting rigid extensions disposed outwardly from the truck frame, the lower ends of the springs not only are held in non-shifting relation with the truck frame but the center-to-center distance between the bolster springs at opposite sides of the truck is greatly increased (for example from four feet eight and three quarter inches in present day truck constructions to approximately eight feet two inches in our improved structure) and, approximately three times the resistance to rolling obtained, thereby providing a smoother riding car, with many of the wearing parts, heretofore employed, eliminated; with the springs located where accessibility and inspection are greatly facilitated.

The structure shown and described is believed to be a simple embodiment of the invention, but structural modifications are possible and may be made without, however, departing from the spirit of our invention as defined in the appended claims.

What we claim is:

1. In a railway car truck structure, side frame members; spaced transom members united with the side frame members and having their ends inclining downwardly beyond the outer sides of said side frame members and terminating in vertically disposed parallel portions, said portions being provided with closed ended vertical slots; cross-bars or keys of preselected vertical width endwisely slidable through said slots and extending from one transom member slotted portion to the slotted portion of the other transom member; spring seats supported by said keys in non-shifting relation; a bolster arranged between the transom members with its ends extending beneath and beyond the side frame members and its ends provided with downwardly facing pockets aligned with said spring seats; and coil springs arranged in said pockets and seated on said spring seats.

2. In a railway car truck structure, side frame members; a pair of spaced transom members integral with the side frame members with their ends disposed beneath and inclining downwardly beyond the side frame members and terminating in horizontal portions with downwardly extending portions provided with closed ended vertical slots, the downwardly extending portions of both transom members being in parallel relation; cross-bars or keys of preselected vertical width endwisely slidable through the slots of both transom extensions and adapted to effect non-shifting relation therewith; spring receiving receptacles seated on said keys in non-shifting relation therewith; a bolster arranged between the transom members with its ends beneath the side frame members and extending upwardly at the outer sides of the side frame members and having downwardly facing spring receiving pockets vertically aligned with said receptacles; and coil springs whose lower coils are seated in the receptacles while the upper coils are arranged in the bolster pockets.

3. In a railway car truck structure, frame members; a bolster disposed transversely of the truck with its ends extending outwardly beyond the frame members in upwardly disposed spring receiving, downwardly opening pocket portions; a pair of spaced rigidly held extensions, on each side of the truck, disposed laterally beyond the outer sides of the truck frame in spaced relation beneath the pocket portions of the bolster; a spring holding receptacle between the spaced rigidly held extensions; and cross-bars or keys removably supported by the extensions of each pair for adjustably supporting the spring holding receptacles.

4. In a railway car truck structure, truck frame members; a bolster extending transversely of the truck with its ends extending upwardly beyond the outer sides of the frame members and provided with downwardly facing pockets; a pair of parallelly arranged extensions rigidly secured to the truck frame members on each side of the truck and disposed beneath the pocketed end portions of the bolster and vertically spaced therefrom; spring-seat members arranged between each pair of extensions at opposite sides of the truck; coil spring-springs seated on said seat members with the upper ends arranged in said bolster-pockets; and means cooperating with said frame member extensions of each pair whereby the spring seat members are supported against shifting movement and their elevation controlled.

5. In a railway car truck structure, a truck frame provided on each outer side with rigid downwardly disposed extensions provided with vertical slots in opposite sides; a bolster disposed transversely of the truck with its ends extending beyond the outer sides of the frame and provided with downwardly facing pockets; spring seat members movably arranged between the frame extensions on each side of the truck; coil springs seated on said seat members with their upper ends arranged in the bolster pockets; and seat supporting keys removably arranged in said slots for controlling the elevation of the spring seat members, said keys having interengaging relation with the seat members for holding the latter against lateral movement.

6. In a railway car truck structure involving side frame members connected by a pair of transversely disposed and parallel transom members; a bolster disposed transversely of the truck between the transom members with its ends extending outwardly beyond and in spaced relation with the side frame members and provided with downwardly opening spring pockets; rigid frame member extensions disposed downwardly from the juncture between the side frame members and the transom members and extending outwardly beyond the outer sides of the side frame members terminating in slotted vertical portions; removable spring supporting seat members arranged between said vertical portions of the frame member extensions; and means removably arranged in said slotted portions whereby said spring supporting seat members are adjustably held in place and the elevation of the seat members controlled.

7. In a railway car truck structure, a truck side frame provided with spaced apart transom members and a bolster mounted between the spaced transom members; the side frame coincident with the ends of the transom members being provided with downwardly and outwardly disposed extensions terminating in substantially horizontal portions having vertical slots in the side walls thereof; while the bolster end extends beneath the side frame and terminates in an upwardly disposed portion formed to provide a side bearing and a downwardly facing spring receiving cup portion; cross-bars between the spaced frame extensions removably seated in said vertical slots; and spring seat members removably seated on said cross-bars.

KARL F. NYSTROM.
VERNON L. GREEN.

REFERENCES CITED

The following references are of record in the file of this patent:

UNITED STATES PATENTS

| Number | Name | Date |
|---|---|---|
| 674,225 | Taylor | May 14, 1901 |
| 934,955 | Woodard | Sept. 21, 1909 |
| 784,299 | Brill | Mar. 7, 1905 |
| 2,326,993 | Buchwalter | Aug. 17, 1943 |